(12) United States Patent
Seenumani et al.

(10) Patent No.: US 11,719,602 B2
(45) Date of Patent: Aug. 8, 2023

(54) VEHICLE CONTROL SYSTEM

(71) Applicant: Transportation IP Holdings, LLC, Norwalk, CT (US)

(72) Inventors: Gayathri Seenumani, Niskayuna, NY (US); Harry Kirk Mathews, Jr., Niskayuna, NY (US); James D. Brooks, Schenectady, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 662 days.

(21) Appl. No.: 16/727,220

(22) Filed: Dec. 26, 2019

(65) Prior Publication Data

US 2020/0149996 A1    May 14, 2020

Related U.S. Application Data

(63) Continuation-in-part of application No. 16/438,230, filed on Jun. 11, 2019, now Pat. No. 11,509,256, (Continued)

(51) Int. Cl.
| | |
|---|---|
| *G01M 15/11* | (2006.01) |
| *G01M 15/12* | (2006.01) |

(Continued)

(52) U.S. Cl.
CPC .......... *G01M 15/11* (2013.01); *F02B 63/047* (2013.01); *F02D 29/02* (2013.01); *F02D 29/06* (2013.01);

(Continued)

(58) Field of Classification Search
CPC .......... B60L 1/00; B60L 7/10; B60L 15/2045; B60L 50/10; B60L 53/50; B60L 55/00;

(Continued)

(56) References Cited

U.S. PATENT DOCUMENTS

| | | |
|---|---|---|
| 9,669,811 B2 | 6/2017 | Brooks et al. |
| 9,702,715 B2 | 7/2017 | Cooper et al. |

(Continued)

OTHER PUBLICATIONS

First Examination Report for related Australian Patent Application No. 2020289849 ated Nov. 25, 2021 (9 pages).

(Continued)

*Primary Examiner* — Peter D Nolan
*Assistant Examiner* — Ce Li Li
(74) *Attorney, Agent, or Firm* — The Small Patent Law Group LLC; Josef L. Hoffmann

(57) ABSTRACT

A method that may include obtaining environmental parameters related to one or more routes of a trip for a first vehicle system, and determining one or more expenditure sections and one or more charging sections of the one or more routes by predicting where the first vehicle system will consume energy and where the first vehicle system will generate the energy, respectively, during the trip based on the environmental parameters. A first trip plan may be obtained for the trip based on the one or more expenditure sections and the one or more charging sections, the trip plan designating one or more operational settings for the first vehicle system for travel during the trip.

20 Claims, 4 Drawing Sheets

Related U.S. Application Data which is a continuation of application No. 15/063,043, filed on Mar. 7, 2016, now Pat. No. 10,345,195.

(51) Int. Cl.

| | | |
|---|---|---|
| *F02D 41/22* | (2006.01) | |
| *F02D 29/06* | (2006.01) | |
| *F02D 29/02* | (2006.01) | |
| *F02D 41/00* | (2006.01) | |
| *F02B 63/04* | (2006.01) | |
| *B60L 50/10* | (2019.01) | |
| *F02D 41/14* | (2006.01) | |
| *F02D 41/28* | (2006.01) | |

(52) U.S. Cl.
CPC ..... *F02D 41/0085* (2013.01); *F02D 41/0097* (2013.01); *F02D 41/22* (2013.01); *G01M 15/12* (2013.01); *B60L 50/10* (2019.02); *F02D 41/1498* (2013.01); *F02D 2041/288* (2013.01); *F02D 2200/101* (2013.01); *F02D 2200/1002* (2013.01); *Y02T 10/40* (2013.01)

(58) Field of Classification Search
CPC .. B60L 58/12; B60L 2200/26; B60L 2240/12; B60L 2240/72; B60L 2240/80; B60W 20/00; B60W 2556/45; B60W 2556/50; B60W 50/0097; F02D 2041/288; F02D 2200/1002; F02D 2200/101; F02D 2200/70; F02D 29/02; F02D 29/06; F02D 41/0085; F02D 41/0097; F02D 41/1498; F02D 41/22; G01M 15/11; G01M 15/12; Y02T 10/40; Y02T 10/84; Y04S 10/126; Y04S 30/12; Y04S 30/14
See application file for complete search history.

(56) References Cited

U.S. PATENT DOCUMENTS

| | | |
|---|---|---|
| 10,168,170 B2 | 1/2019 | North et al. |
| 2012/0316717 A1* | 12/2012 | Daum ............... B60L 55/00 701/22 |
| 2015/0097512 A1 | 4/2015 | Li et al. |
| 2017/0136911 A1 | 5/2017 | Ricci |
| 2018/0186357 A1 | 7/2018 | Deshpande et al. |
| 2019/0283584 A1 | 9/2019 | Koebler et al. |
| 2019/0283602 A1 | 9/2019 | Koebler et al. |

OTHER PUBLICATIONS

Urbaniak, M. et al., "Optimization of using recuperative braking energy on a double-track railway line", Transport Research Procedia, vol. 40, Jan. 2019 [retrieved from internet Oct. 26, 2021] (8 pages) <URL: https://www.researchgate.net/publication/334778738_Optimization_of_using_recuperative_braking_energy_on_a_double-track_railway_line>.

Infinite Energy, "How Does Your Solar Power Feed Back Into the Grid?" [retrieved from internet Oct. 26, 2021] <URL: https://www.infiniteenergy.com.au/solar-power-feed-back-grid/> published Jan. 11, 2017 (7 pages).

Second Examination Report for related Australian Patent Application No. 2020289849 dated Mar. 8, 2022 (4 pages).

Fourth Examination Report for related Australian Patent Application No. 2020289849 dated Oct. 20, 2022 (5 pages).

First Examination Report for related Indian Patent Application No. 202014053120 dated Mar. 28, 2022 (8 pages).

\* cited by examiner

VEHICLE CONTROL SYSTEM

BACKGROUND

Technical Field

Embodiments of the subject matter described herein relate to controlling movement of a vehicle system.

Discussion of Art

Vehicle systems may travel on defined trips from starting or departure locations to destination or arrival locations. Each trip may extend along the route for long distances, and the trip may include one or more designated stops prior to reaching the arrival location, such as for a crew change, refueling, picking up or dropping off passengers and/or cargo, and the like. Some vehicle systems travel according to trip plans that provide instructions for the vehicle system to implement during movement of the vehicle system such that the vehicle system meets or achieves certain objectives during the trip. The objectives for the trip may include reaching the arrival location at or before a predefined arrival time, increasing fuel efficiency (relative to the fuel efficiency of the vehicle system traveling without following the trip plan), abiding by speed limits and emissions limits, and the like. The trip plans may be generated to achieve the specific objectives, so the instructions provided by the trip plans are based on those specific objectives.

Electrically powered vehicles that include battery powered engines may have additional considerations when forming a trip plan. For example, with limited numbers of wayside charging systems, determinations may need to be made regarding when a vehicle should stop at such a wayside charging system. For vehicles that only use battery power, determinations must be made regarding how far a vehicle may travel, based on variables, including weather, wind, speed limits, vehicle weight, stops and starts, or the like, before the vehicle must stop at a wayside charging system. Similarly, the amount of charge provided, including the time spent recharging a battery directly impacts the amount of time a vehicle is on a trip. Additionally, during braking, electricity is generated that may be used to recharge the vehicle battery, also factoring into a trip plan.

BRIEF DESCRIPTION

In accordance with one embodiment, a method may be provided that may include obtaining environmental parameters related to one or more routes of a trip for a first vehicle system, and determining one or more expenditure sections and one or more charging sections of the one or more routes by predicting where the first vehicle system will consume energy and where the first vehicle system will generate the energy, respectively, during the trip based on the environmental parameters. A first trip plan may be obtained for the trip based on the one or more expenditure sections and the one or more charging sections, the trip plan designating one or more operational settings for the first vehicle system for travel during the trip.

In accordance with another embodiment, a system may be provided that can include a controller configured to obtain environmental parameters related to one or more routes of a trip for a first vehicle system. The controller may also be configured to determine one or more expenditure sections and one or more charging sections of the one or more routes by predicting where the first vehicle system will consume energy and where the first vehicle system will generate the energy, respectively, during the trip based on the environmental parameters, obtain a first trip plan for the trip based on the one or more expenditure sections and the one or more charging sections, the first trip plan designating one or more operational settings for the first vehicle system for travel during the trip.

A method may be provided that can include determining operational parameters of an energy storage device of a first vehicle system, determining an off-board energy path to provide energy generated by a braking system of the first vehicle system for a trip along one or more routes based on the operational parameters of the energy storage device, and obtaining a first trip plan for the trip, the first trip plan designating one or more operational settings for the vehicle system at one or more of different locations, different times, or different distances along the one or more routes, the one or more operational settings designated to drive the first vehicle system toward achievement of one or more objectives of the first trip plan.

BRIEF DESCRIPTION OF THE DRAWINGS

The inventive subject matter may be understood from reading the following description of non-limiting embodiments, with reference to the attached drawings, wherein below.

DETAILED DESCRIPTION

In one or more embodiments, an electric propulsion-generating vehicle is provided that includes a controller that manages the current conducted to and from an energy storage device such as a battery. The controller also manages the current that remains stored on-board the vehicle or is provided to an off-board current source for use by other vehicles. A trip plan for the vehicle is determined based on when the current is conducted to and from the energy storage device, and when the current is provided to an off-board current source.

In particular, environmental parameters related to a route of a trip are obtained to predict, estimate, forecast, or otherwise determining when charging of the energy storage device is needed versus when discharging of the energy storage device is advantageous. When current is generated at the vehicle by an auxiliary system, such as the braking system, the controller determines whether current generated by the braking system may be provided to the energy storage device for storage and/or charging, provided to an off-board current source for use by another vehicle, or whether part of the current is stored and/or used for charging and another part of the current is provided to the off-board source. The controller also determines when the battery storage device may be discharged to supply current to an off-board current source. In this manner, numerous vehicles traveling the same or similar routes may share energy to ensure vehicles are able to meet objectives and reduce stops for charging an energy storage device. By reducing stops, faster travel times are accomplished, and costs associated with energy is reduced.

Figure 1:
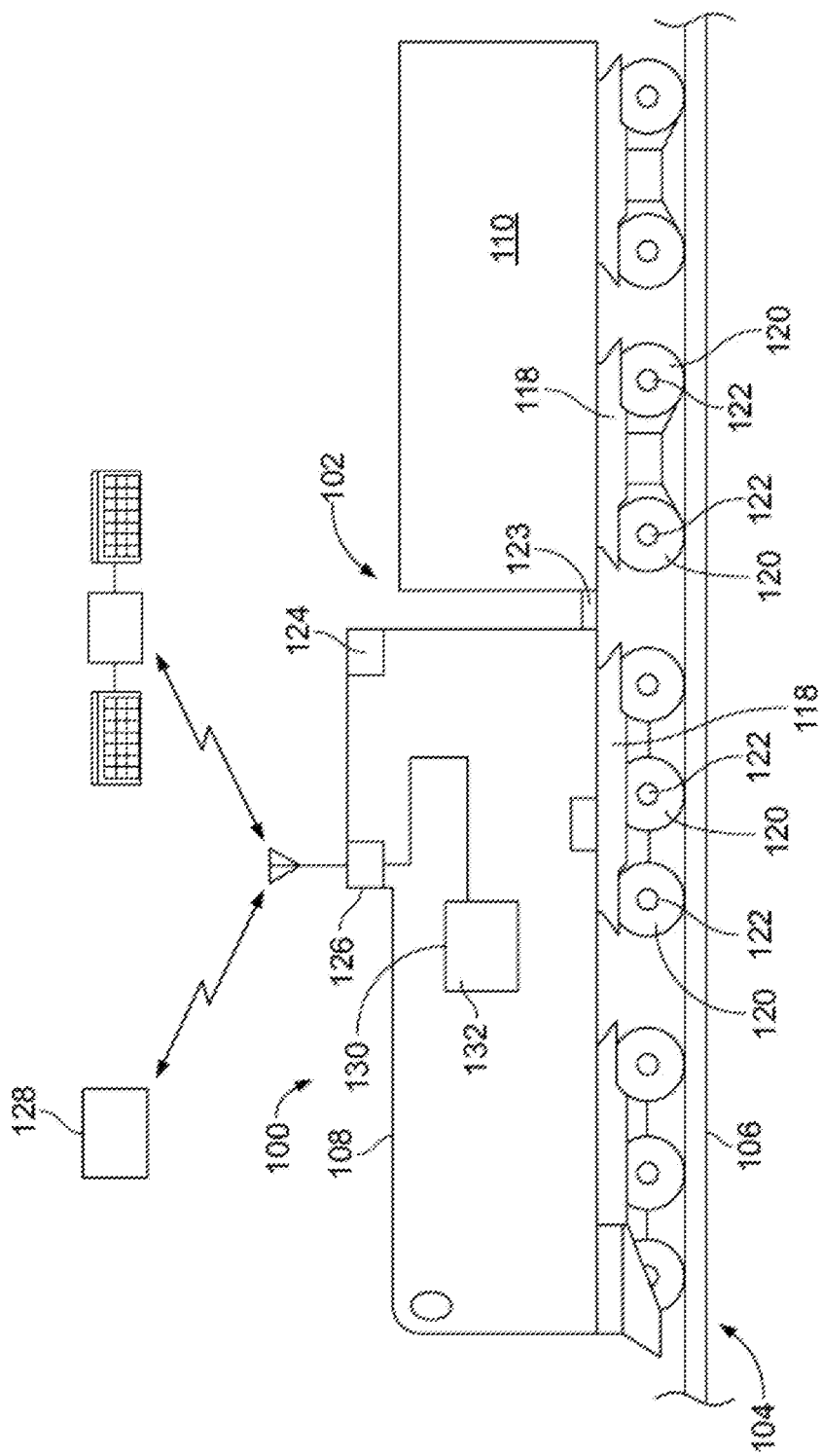
FIG. 1 is a schematic diagram of one embodiment of a control system disposed onboard a vehicle system.

FIG. 1 illustrates a schematic diagram of a control system 100 according to an embodiment. The control system is disposed on a vehicle system 102. The vehicle system is configured to travel along a route 104 on a trip from a starting or departure location to a destination or arrival location. The vehicle system includes one or more vehicles. For example, the vehicle system may include one or more propulsion-generating vehicles 108. Optionally, the vehicle system may include one or more non-propulsion-generating vehicles 110. In embodiments where the vehicle system includes two or more vehicles, the vehicles may be mechanically interconnected with each one. Alternatively, the vehicles of such a multi-vehicle vehicle system may not be mechanically coupled with each other. For example, the vehicles may be separate but logically coupled with each other by communicating with each other to move along one or more routes as a group (e.g., a convoy).

In one embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

The propulsion-generating vehicle includes a propulsion subsystem that generates tractive effort to propel the vehicle system. This propulsion subsystem can include components such as traction motors that propel the vehicle system. The propulsion-generating vehicle also can include a braking system that generates braking effort for the vehicle system to slow down or stop the vehicle system from moving. Optionally, the non-propulsion-generating vehicle includes a braking system but not a propulsion subsystem. The propulsion-generating vehicle is referred to herein as a propulsion vehicle, and the non-propulsion-generating vehicle is referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle.

The control system controls the movements of the vehicle system. In one example, the control system is disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

The control system may include a communication system 126 that communicates with vehicles in the vehicle system and/or with remote locations, such as a remote (dispatch) location 128, other vehicle systems, etc. The communication system may include a receiver and a transmitter, or a transceiver that performs both receiving and transmitting functions. The communication system may also include an antenna and associated circuitry.

The control system has a controller 130 or control unit that is a hardware and/or software system which operates to perform one or more functions for the vehicle system. The controller receives information from components of the control system, analyzes the received information, and generates operational settings for the vehicle system to control the movements of the vehicle system. The operational settings may be contained in a trip plan. The controller may have access to, or receives information from, a locator device, a vehicle characterization element, trip characterization element, and at least some of the other sensors on the vehicle system.

The controller of the control system further includes a trip characterization element 132. The trip characterization element is configured to provide information about the trip of the vehicle system along the route. The trip information may include route characteristics, designated locations, designated stopping locations, schedule times, meet-up events, directions along the route, and the like.

For example, the designated route characteristics may include grade, elevation slow warnings, weather conditions (e.g., rain and snow), and curvature information. The designated locations may include the locations of wayside devices, passing loops, passenger, crew, and/or cargo changing stations, and the starting and destination locations for the trip. At least some of the designated locations may be designated stopping locations where the vehicle system is scheduled to come to a complete stop for a period of time. For example, a passenger changing station may be a designated stopping location, while a wayside device may be a designated location that is not a stopping location. The wayside device may be used to check on the on-time status of the vehicle system by comparing the actual time at which the vehicle system passes the designated wayside device along the route to a projected time for the vehicle system to pass the wayside device according to the trip plan.

The trip information concerning schedule times may include departure times and arrival times for the overall trip, times for reaching designated locations, and/or arrival times, break times (e.g., the time that the vehicle system is stopped), and departure times at various designated stopping locations during the trip. The meet-up events include locations of passing loops and timing information for passing, or getting passed by, another vehicle system on the same route. The directions along the route are directions used to traverse the route to reach the destination or arrival location. The directions may be updated to provide a path around a congested area or a construction or maintenance area of the route.

The trip characterization element may be a database stored in an electronic storage device, or memory. The information in the trip characterization element may be input via the user interface device by an operator, may be automatically uploaded, or may be received remotely via the communication system. The source for at least some of the information in the trip characterization element may be a trip manifest, a log, or the like.

In an embodiment, the controller of the control system also includes a vehicle characterization element 134. The vehicle characterization element may provide information about the make-up of the vehicle system, such as the type of cars (for example, the manufacturer, the product number, the materials, etc.), the number of cars, the weight of cars, whether the cars are consistent (meaning relatively identical in weight and distribution throughout the length of the vehicle system) or inconsistent, the type and weight of cargo, the total weight of the vehicle system, the number of propulsion vehicles, the position and arrangement of propulsion vehicles relative to the cars, the type of propulsion vehicles (including the manufacturer, the product number, power output capabilities, available throttle settings, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

Figures 2, 3:
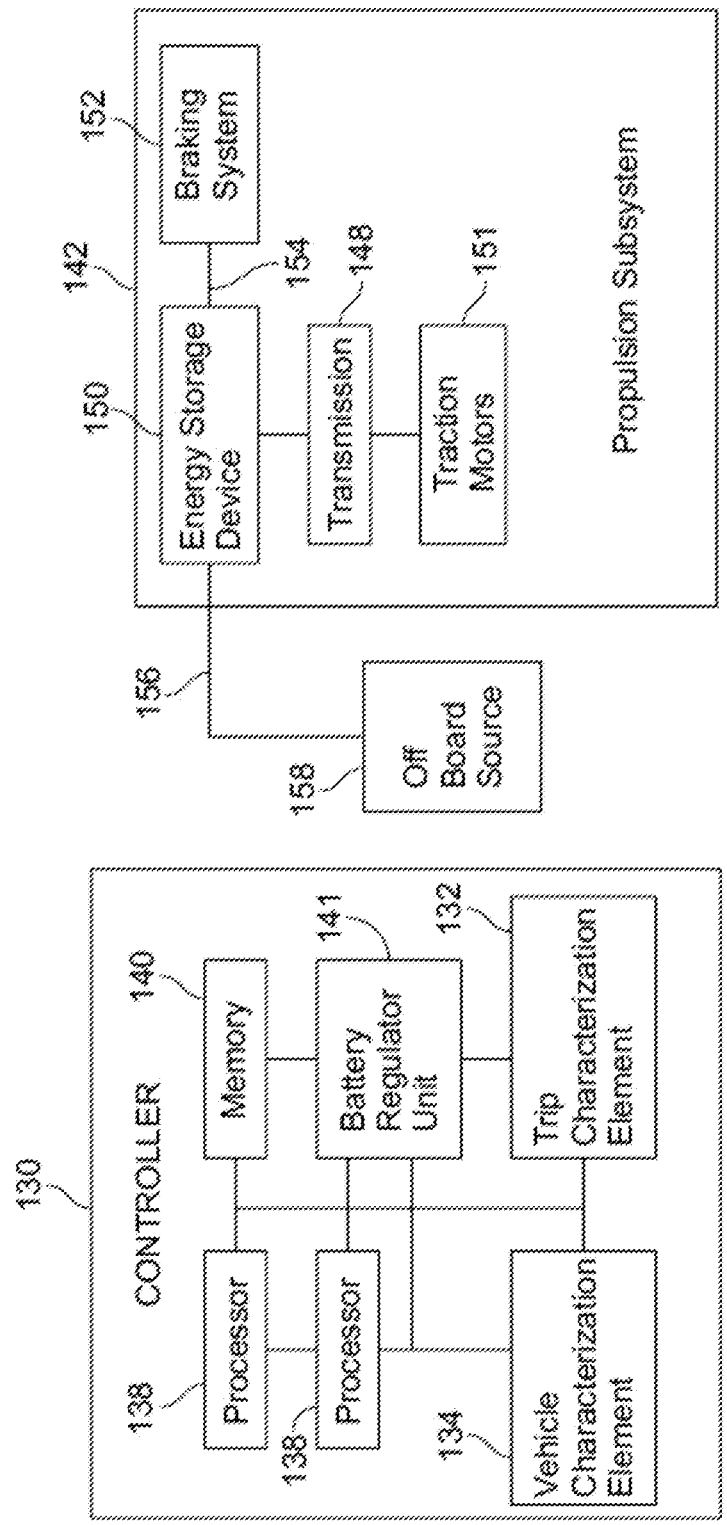
FIG. 2 is a schematic diagram of a controller.
FIG. 3 is a schematic diagram of a propulsion subsystem.

FIG. 2 provides a schematic illustration of a controller that is configured to control operation of a propulsion vehicle. The controller may be a device that includes one or more processors 138 therein (e.g., within a housing). Each processor may include a microprocessor or equivalent control circuitry. At least one algorithm operates within the one or more processors. For example, the one or more processors may operate according to one or more algorithms to generate a trip plan.

The trip plan designates one or more operational settings for the vehicle system to implement or execute during the trip as a function of distance, time, and/or location along the route. The operational settings may include tractive and braking efforts for the vehicle system. For example, the operational settings may dictate different speeds, throttle settings, brake settings, accelerations, or the like, of the vehicle system 102 for different locations, times, and/or distances along the route traversed by the vehicle system 102.

The trip plan can be configured to drive the vehicle system to achieve or increase specific goals or objectives during the trip of the vehicle system, while meeting or abiding by designated constraints, restrictions, and limitations. Some possible objectives include increasing energy (e.g., stored electric current) efficiency, reducing stops for recharging, reducing trip duration, reducing wheel and vehicle wear, reducing audible noise generated by the vehicle system, reducing emissions generated by the vehicle system, or the like.

The constraints or limitations may include speed limits, schedules (such as arrival times at various designated locations), environmental regulations, standards, limits on audible noise, etc. The operational settings of the trip plan may be configured to increase the level of attainment of the specified objectives relative to the vehicle system traveling along the route for the trip according to operational settings that differ from the one or more operational settings of the trip plan (e.g., such as if the human operator of the vehicle system determines the tractive and brake settings for the trip). One example of an objective of the trip plan is to reduce recharging stops along a route during the trip. By implementing the operational settings designated by the trip plan, the number of recharging stops may be reduced relative to the amount of stops the same vehicle system along the same segment of the route in the same time period would make, but not for the trip plan.

The trip plan may be established using an algorithm based on models for vehicle behavior for the vehicle system along the route. The algorithm may include a series of non-linear differential equations derived from applicable physics equations with simplifying assumptions. The algorithm may include calculations and algorithms described herein with relation to electric vehicles and using an energy storage device.

In an embodiment, the control system is configured to generate multiple trip plans for the vehicle system to follow along the route during the trip. The multiple trip plans may have different objectives from one another. The difference in objectives may be based on operating conditions of the vehicle system. The operating conditions may include battery life, vehicle speed, operating temperature, throttle setting, notch position, a location of the vehicle system along the route, or the like. Different objectives may include reducing battery degradation, increasing trip speed, reducing stops for charging, reducing use of catenary power, reducing costs from catenary power use, etc.

For example, the vehicle system may move according to a first trip plan responsive to the vehicle system reducing catenary supplied power, and the vehicle system may move according to a different, second trip plan responsive to the vehicle system reducing the number of stops to charge the vehicle battery. Both the first and second trip plans may be generated by the control system prior to the vehicle system embarking on the trip. Alternatively, only the first trip plan may be generated prior to the trip, and the second trip plan may be generated during the trip of the vehicle system in response to the operating condition of the vehicle system crossing the designated threshold. For example, the second trip plan may be a modified trip plan or a trip re-plan that modifies or updates the previously-generated first trip plan to account for the changing objectives.

In an alternative embodiment, instead of generating multiple different trip plans, the control system may be configured to generate a single trip plan that accounts for changing objectives of the vehicle system along the route. For example, the trip plan may constructively divide the trip into multiple segments based on time, location, or a projected speed of the vehicle system along the route. In some of the segments, the operational settings of the trip plan are designated to drive the vehicle system toward achievement of at least a first objective. In at least one other segment, the operational settings of the trip plan are designated to drive the vehicle system toward achievement of at least a different, second objective.

As an example, during a first section of a trip, the vehicle may drive through one or more states that have a relatively high cost for catenary power. Therefore, the first objective during this first section of the trip may be us reduce the use of catenary power along this section. During a second section of the trip, the vehicle may drive through a state that has relatively low cost for catenary power. During this second section the objective may be increase trip speed. So, during the same trip, a first trip plan and a second trip plan may be utilized based on the geographic location of the vehicle during the trip.

The control system may be configured to control the vehicle system along the trip based on the trip plan, such that the vehicle system travels according to the trip plan. In a closed loop mode or configuration, the control system may autonomously control or implement propulsion and braking subsystems of the vehicle system consistent with the trip plan, without requiring the input of a human operator. In an open loop coaching mode, the operator may be involved in the control of the vehicle system according to the trip plan. For example, the control system may present or display the operational settings of the trip plan to the operator as directions on how to control the vehicle system to follow the trip plan. The operator may then control the vehicle system in response to the directions.

With reference to FIG. 2, the controller optionally may also include a controller memory 140, which is an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The controller may also include a battery regulator unit 141 that may include battery models for calculating battery C-rate, battery life, battery degradation, battery state, battery power rate limits, battery state of charge, battery depth discharge, battery thermal properties, power boost that may be used to provide additional battery supplementation, battery charging, or the like. Battery C-rate may be the measure of the rate at which a battery may be being charged or discharged. The measurement may be taken by determining the current through the battery divided by the theoretical current draw under which the battery would deliver a nominal rated capacity in one hour as presented in units of 1/hours. Battery degradation is the amount of energy storage capacity lost by a battery and may be measured in units of megawatt hours (MWH). Battery power rate limits may also be referred to as battery coulomb rating is the rate at which the battery may discharge in units of coulombs. Battery state of charge is considered the percentage of charge a battery has remaining compared to the battery capacity provided in a range between 0-100%. Battery depth of discharge is the amount charge a battery has discharged. This may be provided in units of Amps, or a percentage. The battery depth of discharge is a complement to the state of charge because when the battery depth discharge is at 100%, the battery state of charge is at 0%, and when the battery depth discharge is at 0%, the battery state of charge is at 100%.

Additionally, information and data determined or derived by the one or more processors, trip characterization element, other sensors, global positioning system sensors, vehicle characterization element, battery regulator unit, etc. may be stored in the controller memory for later processing. By using, collecting, and processing this information and data, the controller may determine operational settings for one or more vehicles for a trip plan.

The operational settings may be one or more of speeds, throttle settings, brake settings, charge rate settings, discharge rate settings, or accelerations for the vehicle system to implement during the trip. Battery charge rate is the measure of the rate at which a battery is being charged or discharged. The measurement is taken by determining the current through the battery divided by the theoretical current draw under which the battery would deliver a nominal rated capacity in one hour as presented in units of 1/hours. Battery discharge is the amount charge a battery has discharged. The discharge setting may include the amps used by the energy storage device.

Optionally, the controller may be configured to communicate at least some of the operational settings designated by the controller in a control signal. The control signal may be directed to the propulsion subsystem, the braking subsystem, or a user interface device of the vehicle system. For example, the control signal may be directed to the propulsion subsystem and may include throttle settings of a traction motor for the propulsion subsystem to implement autonomously upon receipt of the control signal.

In another example, the control signal may be directed to a user interface device that displays and/or otherwise presents information to a human operator of the vehicle system. The control signal to the user interface device may include throttle settings for a throttle that controls the propulsion subsystem. The control signal may also include data for displaying the throttle settings visually on a display of the user interface device and/or for alerting the operator audibly using a speaker of the user interface device. The throttle settings optionally may be presented as a suggestion to the operator, for the operator to decide whether or not to implement the suggested throttle settings.

FIG. 3 illustrates a schematic diagram of the propulsion subsystem 142 of the propulsion vehicle of FIG. 1. In one example embodiment, the propulsion subsystem may be on-board a locomotive, while in other example embodiments other vehicles are provided, including automobiles, off-highway vehicles, or the like. In particular, the propulsion subsystem may include an energy storage device 150, coupled to a transmission 148 that may be coupled to traction motors 151 allowing the energy storage device to drive the axles of the propulsion vehicle 108. In one example, the energy storage device may be a battery. In particular, the energy storage device may be able to provide energy, and may also be able store energy. In one example, the energy storage device may be a battery that provides the electrical energy through a chemical process that may be discharged, charged, and stored. In other examples, the energy storage device may store chemical energy, mechanical energy, or the like through other processes.

The propulsion subsystem may include a braking system 152 that includes first electric bus 154 for charging the energy storage device, and a second electric bus 156 for transferring electrical power to an off-board source 158. Specifically, during dynamic braking, electrical power may be generated as a result of the traction motor generating torque to slow a vehicle. The generated electrical power may be transferred from a traction motor through the first electrical bus to the energy storage device in order to recharge the energy storage device. Alternatively, the generated electrical power of the traction motor during braking may also be transferred from the traction motor through the second electric bus to the off-board source. In this manner, the energy storage device may increase the battery discharge rate while traversing up a hill, and then the energy storage device may be recharged through the braking system when the vehicle is going down a downgrade by use of the braking system.

Alternatively, the controller may determine that instead of recharging the energy storage device to transfer the electrical power to an off-board source. Off-board sources may include wayside devices, rails, catenary devices, etc. In one example, the controller may determine that the vehicle can reach a charging station without recharging the battery using the electrical energy generating by the traction motors through braking. Based on this determination, the controller may determine to provide the electrical energy to the off-board source to have for another vehicle that is unable to make it to the same charging station based on its current storage device capacity.

Figure 4:
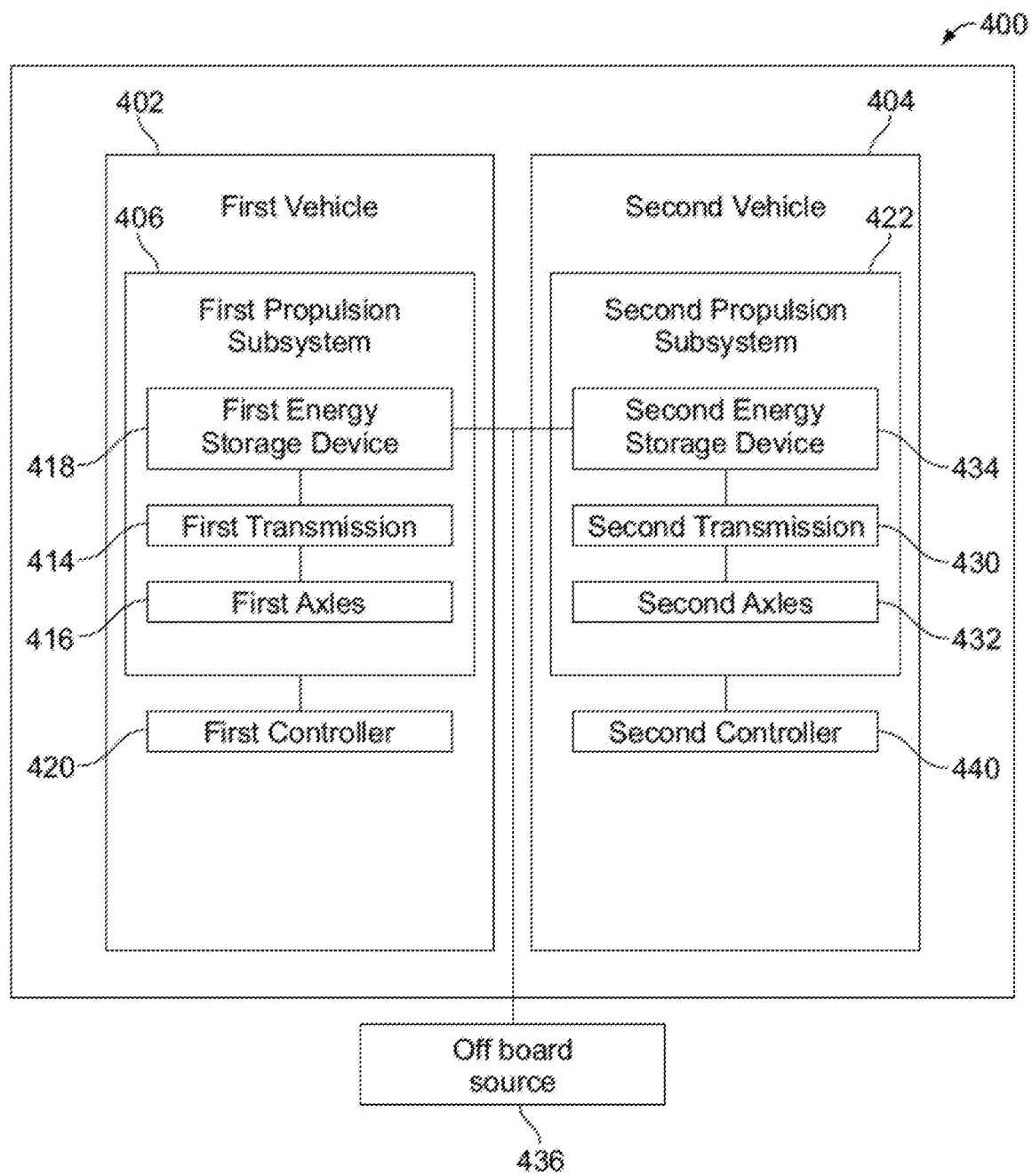
FIG. 4 is a schematic diagram of one embodiment of a vehicle system.

FIG. 4 illustrates a schematic diagram of an alternative embodiment of a vehicle system 400 that has a first vehicle 402 that is a propulsion vehicle. The first vehicle includes a first propulsion subsystem 406 as described above. The first propulsion subsystem includes a first energy storage device 418, coupled to a first transmission 414 allowing the first energy storage device to drive the first axles 416 of the first vehicle. In one example, the first energy storage device may be a battery. In particular, an energy storage device is able to provide energy, and may be also able store energy. While a battery provides the electrical energy through a chemical process that may be discharged, charged, and stored, in other examples the energy storage device may store chemical energy, mechanical energy, or the like through other processes.

The vehicle system also includes a second vehicle 402 having a second propulsion subsystem 422 that includes a second energy storage device 434, coupled to a second transmission 430 allowing the second energy storage device to drive the second axles 432 of the second vehicle. In one example, the second energy storage device 434 may be a battery.

A first controller 420 may concurrently operate the first propulsion subsystem and second propulsion subsystem to concurrently drive the first and second vehicles. The first controller in one example may operate the first propulsion subsystem and second propulsion subsystem independent of one another, for example, only taking into consideration information and data related to the first propulsion subsystem to drive the first axles without consideration of information from the second propulsion subsystem. In another example, the first controller operates the first propulsion subsystem and second propulsion subsystem together such that information or data related to the first propulsion subsystem may result in dynamic modifications of the second propulsion subsystem.

In one example, the first energy storage device may only have enough charge left to efficiently propel the first vehicle for one hour, and the vehicle may have two hours until a next recharging stop. Meanwhile, the second energy storage device may have enough charge left to propel the second vehicle for three hours, and only one hour remaining until a scheduled recharging stop. Based on this information, the first controller may determine to transfer electrical power to an off-board source 436 from the second vehicle. The first vehicle may then charge the first storage device with the transferred electrical power at the off-board source provided by the second vehicle. As a result, the trip plan of the first vehicle may consider trip plans of other vehicles, including the second vehicle.

In one example, the second vehicle may include a second controller 440 in communication with the first controller. Prior to the generation of a second vehicle trip plan, the first vehicle controller communicates with the second vehicle controller to adjust the second vehicle trip plan to accommodate the trip plan of the first vehicle. As a result of the first controller and second controller coordinating trip plans, electrical power may be shared between the first vehicle and second vehicle. The sharing of the electrical power may reduce the number of stops for recharging, and reduce electrical costs during a trip.

In another example, the second vehicle may be traveling on the same route as the first vehicle, only several hours behind the first vehicle. The energy storage device of the second vehicle may be determine to enough charge left on a trip to propel the second vehicle for four hours, and the next charging stop may be in six hours. Meanwhile the first energy storage device may have enough charge to provide up to an additional hour of charge for the second energy storage device. Consequently, the second vehicle will have to receive the one hour of charge from the first vehicle, and an hour of charge from an off-board source. The first controller may determine to provide the extra hour of charge to a first wayside device along the route where the cost of electricity is greater than the cost of electricity at a second wayside device along the route. In this manner, the second vehicle uses the energy from the first vehicle in a more expensive section of the trip, and then receives supplement charging during a section of the trip where the electricity may be cheaper to receive. In this manner, costs for the trip may be reduced.

Figure 5:
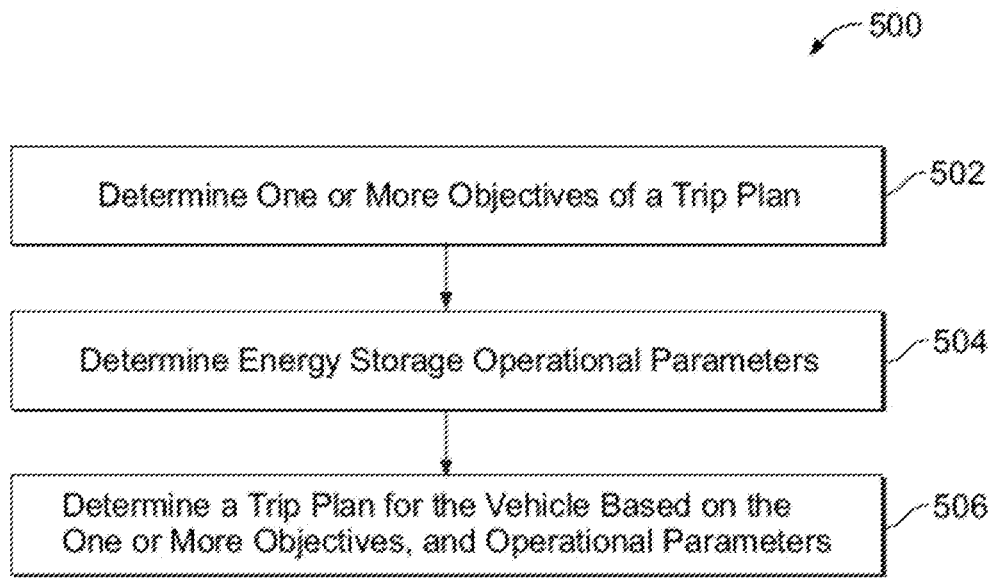
FIG. 5 is a flow chart of one embodiment of a method for controlling a vehicle system that travels on a route.

FIG. 5 is a flow chart of one embodiment of a method 500 for controlling a vehicle system that travels along one or more routes.

At 502, one or more objectives of a trip plan may be determined. In an example, the objective is defined by the following:

$$\min_{F_k, v_k} \sum_{0:N} \Gamma_k(F_k, v_k)$$

Where k is an index of distance mesh points; N is the number of distance mesh points; $F_k = F(x_k)$ and is the total effort or force in pounds force (lbf) on the wheel of the vehicle and the motoring/dynamic brake and airbrake force, where x is a distance that is independently variable; $V_k$ is the vehicle speed in miles per hour (mph); $\Gamma_k = \eta_k P_k + P_{loss,k}$, and is a normalized fuel burn equivalent, where $\eta_k$, $|\eta_k| \le 1$ for normalized regeneration efficiency, which is a function of distance, where 1 represents traction and −1 represents perfect regenerative braking; $P_k = F_k/\alpha_k$ the tractive/braking horse power (HP) at the wheels, and $\alpha_k = 1/V_k$; and $P_{loss,k}$ are losses due to the motor, auxillary sources, and transformer in HP.

Mesh points are points used to form a network, or in the present instance points along a route of a trip. Thus, the determination represents the fuel burned at numerous distances along a route of a trip that may be added in determining the total fuel burned during an entire trip. By varying different variables at individual mesh points, fuel burn may be varied, where the determination may be made to determine the least amount of fuel burn for a trip. The variables being considered may include the distance of the trip, vehicle speed, total effort, horsepower at the wheels, losses due to the motor, auxiliary source, and transformer, etc.

The example objective function represents the energy consumption from the mains and is denoted by $\Gamma k = \eta k P k + P_{loss,k}$. Here, the losses are a function of force and speed and hence the total energy depends both on speed and power. The actual power consumed or regenerated may depend on off-board parameters including a catenary voltage, the regeneration efficiency ($\eta k$) eliminates the need for including grid models and renders a simpler objective equation for this example. Alternatively, the objective function may be represented as a fuel burn equivalent.

At 504, energy storage operational parameters may be determined. Energy storage operational parameters may include data, information, measurement, calculation, model, formula, or the like, that may be used to determine a characteristic of an energy storage device such as a battery. These characteristics may include battery life, battery power, battery capacity, battery C-rate, battery degradation, battery use, battery size, vehicle size, trip route, grade of route, battery performance data, battery power rate limits, battery temperature, battery voltage, battery state of charge, battery depth of discharge, battery ohmic resistance, battery nameplate capacity, anticipated braking during the trip, or the like. Energy storage operational parameters may also include cooling system parameters that may affect the use, efficiency, life, etc. of the energy storage device. For example, a cooling parameter, such as cooling device, or fan usage may be an operational parameter determined. In other examples, an auxiliary system parameter may be an operational parameter determined. Such auxiliary system parameter may include engine use or efficiency for a hybrid vehicle, wheel pressurization, etc. that may be determined and utilized to determine the operation of the energy storage device during a trip.

In one example, the energy storage operational parameters include constraints that include the following equations and determinations:

$$\sum_{k \in 0:N} t_{k+1} - t_k \leq T_{travel}$$

$$v_{min,k} \leq v_k \leq v_{max,k}$$

$$g(F_k, v_k, \delta x_k) = 0$$

$$F_{k+1} - F_k \leq R_U$$

$$R_L \leq F_{k+1} - F_k$$

$$F_k \leq F_{max,k}$$

$$F_{min,k} \leq F_k$$

$$P_k \leq P_{max,k}$$

$$P_{min,k} \leq P_k$$

Where $t_k = \delta x_k / x_k$ is a time at a given mesh point; $\delta x_k = x_{k+1} - x_k$; $V_{min,k}$, $V_{max,k}$ are lower and upper speed limits in mph between the mesh points; $F_{min,k}$, $F_{max,k}$ are lower and upper engine force limits in lbf; $P_{min,k}$, $P_{max,k}$ are lower and upper engine power limits in HP; and $R_L$, $R_U$ are lower and upper rate limits constraints on engine force.

As indicated, the energy storage operational parameters may include travel and the speed limit constraints. The energy storage operational parameters may also include additional constraints that may include vehicle dynamics and engine force rate limits. Specifically, the engine force limits represent a vehicle characteristic and the engine HP limits represent grid constraints that drive power electronics of the vehicle. In this manner, the force and the power are limited by the constraints to sufficiently define the vehicle operation for the highest notch, and lesser values are strictly decided by the fuel efficiency associated with a given operating point. Hence, the lower and upper limits for force constraints, power constraints, and constants, may be namely, Fmax,k=Fmax,Fmin,k=Fmin, Pmax,k=Pmax, Pmin,k=Pmin, where upper limits may pertain to Notch 8, and lower limits may pertain to Notch −8. The operational parameters of the energy storage device may also be based on at least one of life of the energy storage device, a cooling system parameter, or auxiliary system parameter. In particular, auxiliary system parameter may include additional systems. For example, for a hybrid vehicle, an auxiliary system parameter may be engine efficient, tractive force, or the like.

For the electric vehicle, there is a presence of multiple speed dependencies in the force-speed curves, where the force-speed curve is a representation of the inverse relationship between force and speed. Specifically, an electric vehicle may have constant force, linear, and $\propto 1v, \propto 1v2$ dependencies. For example, air resistance may be defined by a Davis equation that may include a constant, a linear component associated with velocity, and a quadradic component associated with velocity. The constant, linear component, and quadradic component may all be determined drag coefficients that are determined through modeling, testing, or the like. Hence the lower and upper limits are functions of speed, namely Fmax,k=Fmax(vk), Fmin, k=Fmin(vk). The power constraints capture the limits, and may depend on the catenary voltage and represented as namely Pmax,k=Pmax(Vcat,k), Pmin,k=Pmin(Vcat,k), where Vcat is the catenary voltage.

At 506, a trip plan for the vehicle is determined based on the one or more objectives, and operational parameters. In one example MATLAB may be used to solve an objective function to generate the trip plan. Specifically, inputs are provided based on operational parameters determined, data files manually inputted by an operator, etc. In one example, the one or more processors use the inputs received to determine a min-time solution for the trip. A min-time solution is the shortest travel time for a given trip which is attained by riding at the maximum allowed speed limits along a route.

As can be seen, the force for an electric engine is bounded by a speed dependent value and treated as a constraint. In addition, the formulation has additional computational requirements because there are additional 1D interpolations that are performed per iteration to compute the constraint and derivatives along with 2D interpolation to compute the objective function value and the derivatives. The current implementation is also designed to deal with neutral zones by setting the upper and lower power limits to zero in the pre-preprocessing steps, which would define the power constraint at the specified mesh points as Pk=0.

In rail-based embodiments, the controller may leverage rail-specific features, such as the availability of track and trip information, and solves a multi-objective optimization problem that increases battery life of a vehicle. The controller also decreases use of catenary KWH by the vehicle and other vehicles. A cost function may be provided that calculates an instantaneous power, including total losses as well as tractive horsepower (HP) as a function of speed and tractive effort. Alternatively, power is derated as a function of notch position and temperature. In addition, a time varying power limit constraint model may be used to represent grid conditions to determine opportunities for supplementing catenary based power with power generated by rail vehicles during trips. By using these determinations with relation to multiple vehicles using the same power grid, peak load may be reduced by determining where along a route to obtain and supply power to achieve faster travel times and reduce power consumption. To this end, enhanced utilization of way side energy storage devices and a common power grid may be achieved. This includes determining when to use grid power, such as in a state or location where grid power is relatively inexpensive, versus when to use battery power, such as in State or location where grid power is relatively expensive.

In another example, a modeling may be used to predict the KWH that will be consumed from a catenary during a trip. By forming this type of model, the amount of KWH consumed from the catenary during the trip may be reduced minimized. The amount of KWH that will be consumed may be defined as the sum of the rail power to achieve a certain speed and the associated losses. The associated losses include traction losses, transformer loses, and auxiliary losses over the trip.

Three different models may be used to make these determinations, including a vehicle dynamics model, a vehicle characteristics model, and a grid model. While these three models are described in greater detail herein, other models may similarly be used to determine energy storage operational parameters.

The train dynamics and the locomotive characteristics models may be used to determine the tractive power requirements, while the grid models are used for computing the transformer and auxiliary losses that depend on the catenary voltage. The grid models predict the variation of catenary voltage along the track based on a given track impedance and substation voltage, and is complex. Given that there are several unknowns in terms of grid parameters, an initial version considers a constant catenary voltage for the grid model at the planner level.

Figure 6:
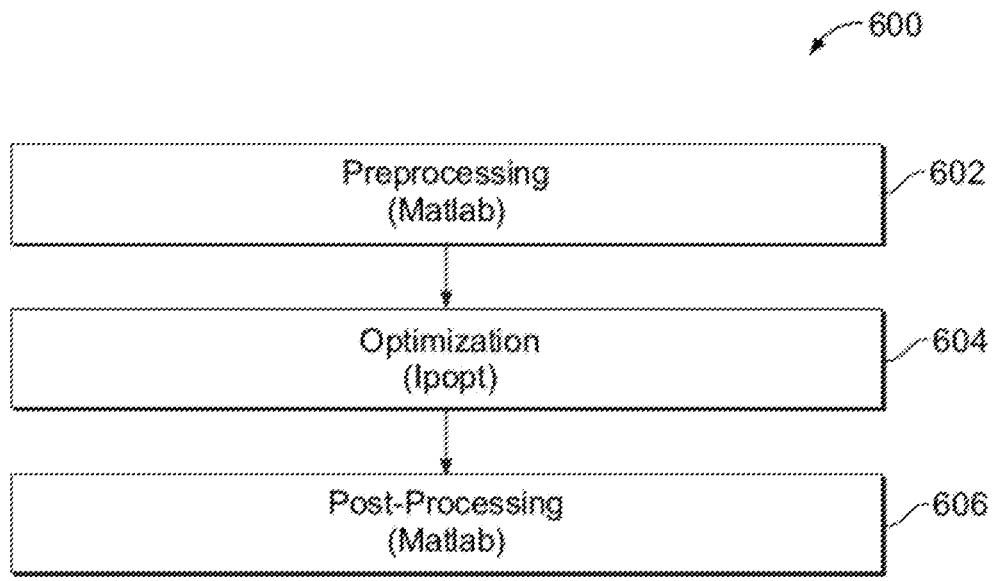
FIG. 6 is a schematic diagram of one embodiment of a trip planner algorithm.

In one example, a look-ahead algorithm is represented schematically as FIG. 6 and is designed to utilize the battery for increased or maximal fuel savings with reduced or minimal battery degradation that justifies the fuel savings. The algorithm considers user inputs along with terrain and system configuration inputs, including the engine operational parameters and the battery, or energy storage device operational parameters as previously determined as described above.

For a given set of inputs, the algorithm enhances over tractive effort (Fk), speed (vk) and battery power (Pbk) for the entire trip duration that would reduce or minimize a fuel-life multi-objective function subject to a set of constraints. The objective function is given as $$J_{EM} = \sum_{k=0}^{N} (\gamma(\eta_t F_k v_k - P_{net}(P_{bk}))) + \lambda dQ_{opt}$$

Where ηtFkvk is tractive power, where ηt is the traction efficiency and Pnet(Pbk) is the net battery power available after accounting for the battery system losses. The penalty parameter is considered to alter the battery utilization to generate tradeoff curves and is typically the ratio of battery to fuel cost. When the battery costs are expensive, the parameter may be set to a higher value which would limit the battery usage to preserve life and vice-versa. Thus, the algorithm may be defined as below:

$$\min_{F_k, \alpha_k, P_{bk}} J_{EM}$$

$$h(F_k, F_{k+1}, \alpha_k, \alpha_{k+1}, \delta x_k, a, b, c) = 0,$$

-continued $$SOE_k = SOE_{k-1} + \frac{\delta x_{k-1}}{E_{max} v_{k-1}} (P_{b,k-1}),$$

$$T_{bk} = T_{b,k-1} + \frac{\delta t_{k-1}}{C_{batt}} \left( Q_{gen} + \frac{T_{amb} - T_{b,k-1}}{R_{batt}} \right)$$

$$\sum_{k=0}^{N} (t_{k+1} - t_k) \le t_f$$

$$\alpha_{min,k} \le \alpha_k \le \alpha_{max,k}$$

$$F_{min} \le F_k \le F_{max}$$

$$R_L \frac{(\alpha_k + \alpha_{k+1})}{2} \le \frac{F_{k+1} - F_k}{\delta x_k} \le R_U \frac{(\alpha_k + \alpha_{k+1})}{2}$$

$$P_{min} \le F_k / \alpha_k - P_{net}(P_{bk}) \le P_{max}$$

$$P_{b,min}(SOE_k) \le P_{bk} \le P_{b,max}(SOE_k)$$

$$T_{b,min} \le T_{bk} \le T_{b,max}$$

$$SOE_{min} \le SOE_k \le SOE_{max}$$

$$R_{LB} \frac{(\alpha_k + \alpha_{k+1})}{2} \le \frac{P_{bk+1} - P_{bk}}{\delta x_k} \le R_{UB} \frac{(\alpha_k + \alpha_{k+1})}{2}$$

Where the DOD is computed as the change in SOE between successive time instants (DODk=SOEk-3 SOEk-1). The inverse of speed (αk) is used as this helps in formulating many constraints to be linear which simplifies the problem. These sets of equations utilized by the algorithm represent, among other things, the dynamics of the vehicle system along with the battery state of charge and temperature respectively. The travel time along with the speed limits, while the tractive effort and the rate limits are also described. The engine power is computed as the difference tractive power requirement and the net battery power, is limited as given where Pmin and Pmax are the engine limits. The total tractive power can reach beyond a current upper limit on the throttle or notch value. The constraints are also described in specific to battery utilization. These include the battery power temperature, SOE limits and rate of change of battery power. It must be noted that lower and upper limits on battery power can be a function of the SOE. For example, the discharge capabilities can reduce significantly at lower SOE that limits the available power and reverse holds true for charge conditions.

The tradeoff is the engine-battery operation where the fuel savings justify the battery degradation costs. In contrast, a trip optimizing algorithm for hybrid vehicles (e.g., diesel electric locomotives) reduces or minimizes just the total fuel γ(ηFkvk). It must be noted that when λ>>1, the solution of the above problem will approach a fuel optimal solution. The above algorithm is classified as a non-linear programming problem and is solved utilizing the interior-point solved IpOpt. The scope of the formulation described may be restricted to vehicle systems which have independent power command to engine and battery. In addition, the consist makeup may be restricted to conventional vehicle systems. The inclusion of these options may be driven by vehicle system infrastructure such as high voltage lines, consist communication, etc.

In yet another example, the trip plan may also include additional supplementation to the energy storage device along a route during the trip in order to provide additional power when traversing particular terrains. For example, the energy storage device may electrically couple to a local catenary that provides supplemental electricity to the energy storage device. Alternatively, the energy storage device may mechanically couple to a wayside device such as a charging station during the trip. In each instance, the propulsion system receives supplemental power from a remote device that couples to the propulsion system.

While the method 500 provided utilizes the energy storage device operational parameters, including models, to determine operating conditions along a route, the operational parameters may also be used to determine the make up of a vehicle. As an example, when the vehicle is a vehicle system that includes numerous propulsion vehicles and non-propulsion vehicles, the provided models and determinations may be made to determine how many electrically driven vehicles should be provided in a vehicle system. In one example, the propulsion vehicles in the vehicle system are all electrically driven vehicles, while in other example, a combination of electrically driven vehicles and hybrid vehicles are utilized. Additionally determined is the amount of non-propulsion vehicles to be used in combination with the hybrid vehicles. Consequently, improved fuel efficiencies may be realized along a trip while reducing or minimizing battery degradation.

FIG. 6 illustrates a schematic flow diagram of a look ahead algorithm that may be used to implement the method of FIG. 5. At 602, one or more processors preprocess a trip based on environmental parameters related to one or more routes of a trip. The environmental parameters may be obtained from on-board the vehicle system or off-board the vehicle system. The term "obtain" or "obtaining", as used in connection with data, signals, information and the like, includes at least one of i) accessing memory of the energy management system or of an external device or remote server where the data, signals, information, etc. are stored, ii) receiving the data, signals, information, etc. over a wireless communications link between the energy management device and a local external device, and/or iii) receiving the data, signals, information, etc. at a remote server over a network connection. The obtaining operation, when from the perspective of the energy management system, may include sensing new signals in real time, and/or accessing memory to read stored data, signals, information, etc. from memory within the energy management system. The obtaining operation, when from the perspective of a local external device, includes receiving the data, signals, information, etc. at a transceiver of the local external device where the data, signals, information, etc. are transmitted from an energy management device and/or a remote server. The obtaining operation may be from the perspective of a remote server, such as when receiving the data, signals, information, etc. at a network interface from a local external device and/or directly from an energy management device. The remote server may also obtain the data, signals, information, etc. from local memory and/or from other memory, such as within a cloud storage environment and/or from the memory of a workstation or local dispatch device.

In one example, the environmental parameters may include map data, track information, terrain information, geographic locations, regulatory speed requirement for sections of the route, availability of current from other vehicles along the route, etc. These environmental parameters in one example may be obtained from an on-board database or memory at an on-board computing device, determined by an on-board computing device based at least on sensor information, received from a database or memory of an off-board computing device in communication with an on-board computing device, determined at an off-board computing device in communication with an on-board computing device, or the like. Then, based on the obtained data and information, the trip may be preprocessed. In an example, MATLAB may be used to preprocess the trip.

At 604, optimization of the trip based on the environmental parameters and preprocessing is determined. In one example, modeling and methodologies as described in relation to the method of FIG. 5 are used to make the determination. Specifically, the one or more processors may determine one or more expenditure sections and one or more charging sections of the one or more routes by predicting where an energy storage device of a first vehicle system will consume energy and where the first vehicle system will charge the energy storage device, respectively, during the trip based on the environmental parameters.

Expenditure sections are sections of a trip may be considered where energy of an energy storage device, such as a battery, may be consumed to power the vehicle system. In this manner, the energy storage device is being expended. In one example, an expenditure section is a section that includes an uphill climb. Alternatively, expenditure sections may include sections of a route where the terrain is flat, where excess air resistance occurs, where speed limits are increased, etc. In sum, any section of a trip where the battery may be used for propelling the vehicle instead of being charged by the braking system may be considered an expenditure section.

Meanwhile, a charging section may be any section of a trip when the energy storage device is charged. The energy storage device in one example may be charged by an on-board source, such as the braking system, and current generated by applying brakes. In one example, the charging section may be a section of the trip where the vehicle system goes down a hill or mountainside. Alternatively, the charging section may be where a speed limit is reduced, the vehicle system slows due to traffic, the vehicle system slows due to being in a populated area, wind behind the vehicle system assists in propelling the vehicle system, or the like. Specifically, in each charging section the braking system may be actuated, where actuation of the braking system generates and charges the energy storage device as describe herein.

The energy storage device in another example may be charged by an off-board source, such as a catenary, wayside charging station, second vehicle system, etc. In particular, the vehicle system may electrically couple to the off-board source to charge the energy storage device in the charging section. In one example, the vehicle system is a first vehicle system that communicates with a second vehicle system to determine a trip plan of an upcoming trip of the second vehicle system. The first vehicle system may then analyze the trip plan of the second vehicle system to determine if the second vehicle system may share energy during the upcoming trip. In particular, within the trip plan of the second vehicle system, the second vehicle system may be scheduled to recharge at a recharging station when the second vehicle system still has three hours of charge left. If the first vehicle system in determining the trip plan for the first vehicle system determines that the first vehicle system will be an hour short of charge to reach a final destination, the first vehicle system may communicate with the second vehicle system to supply one hour of charge time to a wayside device during a section taken by both the first vehicle system and second vehicle system. In this manner, the communication of the first vehicle system alters the trip plan of the second vehicle system by having the second vehicle system supply energy to the wayside device. Still, by receiving the extra energy from the second vehicle system, the first vehicle system avoids an additional stop for charging with energy that was readily available within the second vehicle system. Consequently, the trip speed of the first vehicle system is improved.

The one or more processors may then make determinations regarding one or more operational settings of the first vehicle system based on each expenditure section and charging section. As an example, when a vehicle system is moving down a hillside and will then goes up a hillside after exiting the downhill section, the vehicle system may determine to brake the vehicle while going down the downhill section, making the downhill section a charging section. Then, when the vehicle begins going up the uphill section, the determination may be made to expend the energy received from charging the energy storage device to propel the vehicle system up the uphill section. In this manner, the uphill section is an expenditure section. By braking the vehicle system when traveling down the downhill section, the kinetic energy that is generated by gravity by having the vehicle system go down the hillside is essentially transferred to the energy storage device through the braking system for use when the vehicle system goes up the hillside. Therefore, by braking the vehicle system down the downhill instead of continuing to propel the vehicle, additional charge is provided into the energy storage device for going up the uphill, improving the life of the energy storage device.

At 606, post processing occurs to generate one or more trip plans. In one example, a first trip plan is obtained for the trip based on the one or more expenditure sections and the one or more charging sections. The trip plan designates the one or more operational settings for the first vehicle system for travel during the trip. In one embodiment the operational setting is a throttle setting that is determined for each expenditure section and charging section of the trip. The throttle setting may include any setting causing forward movement of the vehicle system and in one example may include notch position. In an example, the post processing may occur in MATLAB.

Thus provided are systems and methods of providing one or more trip plans for an electrically driven vehicle. The trip plan may consider environmental parameters associated with the trip, including locations and availability of current for charging an energy storage device. To this end, the availability of current that may be generated by an on-board braking system, or shared by another vehicle at an off-board source is included as an environmental parameter for determining the trip plan. By forming the trip plan, off-board charging, and associated cost, may be reduced, along with the amount of stops a first vehicle needs for recharging an energy storage device.

In one or more embodiments, a method may be provided that can include obtaining environmental parameters related to one or more routes of a trip for a first vehicle system, and determining one or more expenditure sections and one or more charging sections of the one or more routes by predicting where the first vehicle system will consume energy and where the first vehicle system will generate the energy, respectively, during the trip based on the environmental parameters. The method may also include obtaining a first trip plan for the trip based on the one or more expenditure sections and the one or more charging sections, the trip plan designating one or more operational settings for the first vehicle system for travel during the trip.

Optionally, determining one or more energy expenditure sections of the one or more routes includes predicting usage of an energy storage device during the trip.

Optionally, the method may also include determining a location of at least one off-board energy supply system along the one or more routes, and determining an amount of energy available from the at least one off-board energy supply system. The method may also include obtaining the first trip plan for the trip based on the amount of energy available from the at least one off-board energy supply system.

Optionally, determining the amount of energy availably from the at least one off-board energy supply system may include receiving a second trip plan of a second vehicle system and determining when the second vehicle system will supply energy to the off-board energy supply system.

Optionally, the method may also include determining operational parameters of an energy storage device based on at least one of life of the energy storage device, a cooling system parameter, or auxiliary system parameter.

Optionally, the operational parameters of the energy storage device may also be determined based on a throttle position of the first vehicle system.

Optionally, the one or more operational settings may include at least one of speed, tractive horsepower, tractive effort, or instantaneous power.

In one or more embodiments a system may be provided that includes a controller that may be configured to determine environmental parameters related to one or more routes of a trip for a first vehicle system, and determine one or more expenditure sections and one or more charging sections of the one or more routes by predicting where the first vehicle system will consume energy and where the first vehicle system will generate the energy, respectively, during the trip based on the environmental parameters. The controller may also be configured to obtain a first trip plan for the trip based on the one or more expenditure sections and the one or more charging sections, the first trip plan designating one or more operational settings for the first vehicle system for travel during the trip.

Optionally, to determine one or more energy expenditure sections of the one or more routes may include predicting usage of an energy storage device during the trip.

Optionally, the energy storage device may be configured to supply energy to an energy grid when the first vehicle system travels along the one or more charging sections of the one or more routes, and receive energy from the energy grid when the first vehicle system travels along the one or more energy expenditure sections of the one or more routes.

Optionally, the energy grid is an off-board energy grid that receives current from at least one of a catenary, a wayside storage device, or second vehicle system.

Optionally, the energy grid may be a braking system energy grid on-board the first vehicle system.

Optionally, the controller may be configured to receive an input from a second vehicle system related to one or more operational settings of the second vehicle system, and obtain the first trip plan for the trip based on the input from the second vehicle system.

Optionally, the one or more operational settings of the second vehicle system may include supplying energy to an off-board energy grid.

Optionally, the controller may be configured to designate the one or more operational settings for the second vehicle system at one or more of different locations, different times, or different distances along one or more routes of the second vehicle system to promote achievement of one or more objectives for the trip of the first vehicle system.

In one or more embodiments, a method may be provided that can include determining operational parameters of an energy storage device of a first vehicle system, and determining an off-board energy path to provide energy generated by a braking system of the first vehicle system for a trip along one or more routes based on the operational parameters of the energy storage device. The method may also include obtaining a first trip plan for the trip, the first trip plan designating one or more operational settings for the vehicle system at one or more of different locations, different times, or different distances along the one or more routes, the one or more operational settings designated to drive the first vehicle system toward achievement of one or more objectives of the first trip plan.

Optionally, the off-board energy path may include at least one of an off-board energy grid, or a wayside energy storage device.

Optionally, the operational parameters of the energy storage device may be determined based on at least one of life of the energy storage device, a cooling system parameter, or auxiliary system parameter.

Optionally, determining the off-board energy path to provide energy may include receiving a second trip plan of a second vehicle system.

Optionally, determining the off-board energy path to provide energy may include determining locations of off-board wayside devices along the one or more routes of the trip.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   obtaining environmental parameters related to one or more routes of a trip for a first vehicle system;
   determining one or more expenditure sections and one or more charging sections of the one or more routes by predicting where the first vehicle system will consume energy from an energy storage device coupled to the first vehicle system and where the first vehicle system will charge the energy storage device, respectively, during the trip based on the environmental parameters;
   generating a first trip plan for the trip based on the one or more expenditure sections and the one or more charging sections, the first trip plan designating one or more operational settings for the first vehicle system for travel during the trip;
   determining when the energy storage device can supply current to an off-board energy supply system;
   determining when a second vehicle system will supply or obtain energy to and from the off-board energy supply system;
   modifying the first trip plan based on when the energy storage device can supply the current to the off-board energy supply system and when the second vehicle system will supply or obtain energy to and from the off-board energy supply system; and
   supplying the current to the off-board energy supply system based on modifying the first trip plan.

2. The method of claim 1, wherein determining the one or more expenditure sections of the one or more routes includes predicting usage of the energy storage device during the trip.

3. The method of claim 1, further comprising:
   determining a location of the off-board energy supply system along the one or more routes;
   determining an amount of the energy available from the off-board energy supply system; and
   obtaining the first trip plan for the trip based on the amount of the energy available from the off-board energy supply system.

4. The method of claim 3, wherein determining the amount of energy availably from the off-board energy supply system includes receiving a second trip plan of a second vehicle system and determining when the second vehicle system will supply the energy to the off-board energy supply system.

5. The method of claim 1, further comprising:
   determining operational parameters of the energy storage device based on at least one of life of the energy storage device, a cooling system parameter, or auxiliary system parameter; and obtaining the first trip plan for the trip based on the operational parameters of the energy storage device.

6. The method of claim 5, wherein the operational parameters of the energy storage device are also determined based on a throttle position of the first vehicle system.

7. The method of claim 1, wherein the first trip plan designates one or more operational settings that include at least one of speed, tractive power, tractive effort, braking effort, or braking power.

8. A system comprising:
a controller configured to:
obtain environmental parameters related to one or more routes of a trip for a first vehicle system;
determine one or more expenditure sections and one or more charging sections of the one or more routes by predicting where the first vehicle system will consume energy of an energy storage device of the first vehicle system and where the first vehicle system will charge the energy storage device, respectively, during the trip based on the environmental parameters;
generate a first trip plan for the trip based on the one or more expenditure sections and the one or more charging sections, the first trip plan designating one or more operational settings for the first vehicle system for travel during the trip;
determine when the energy storage device can supply current to an off-board energy supply system;
determine when a second vehicle system will obtain or supply energy from or to the off-board energy supply system;
modify the first trip plan based on when the second vehicle system will obtain or supply the energy to the off-board energy supply system, and when the energy storage device can supply the current to the off-board energy supply system; and
supply, with the energy storage device, current to the off-board energy supply system based on modifying the first trip plan.

9. The system of claim 8, wherein to determine the one or more expenditure sections of the one or more routes the controller is configured to predict usage of the energy storage device during the trip.

10. The system of claim 9, wherein the energy storage device is configured to supply energy to an energy grid when the first vehicle system travels along the one or more charging sections of the one or more routes, and receive energy from the energy grid when the first vehicle system travels along the one or more expenditure sections of the one or more routes.

11. The system of claim 10, wherein the energy grid is an off-board energy grid that receives current from at least one of a catenary, third rail, a wayside storage device, or the second vehicle system.

12. The system of claim 9, wherein the energy grid is a braking system energy grid on-board the first vehicle system.

13. The system of claim 8, wherein the controller is configured to receive an input from the second vehicle system, and obtain the first trip plan for the trip based on the input from the second vehicle system.

14. The system of claim 13, wherein the one or more operational settings of the second vehicle system include supplying energy to an off-board energy grid.

15. The system of claim 13, wherein the controller is configured to designate the one or more operational settings for the second vehicle system at one or more of a different location, a different time, or a different distance along one or more routes of the second vehicle system to promote achievement of one or more objectives for the trip of the first vehicle system.

16. A method comprising:
obtaining operational parameters of an energy storage device of a first vehicle system;
determining an off-board energy path to provide energy generated by a braking system of the first vehicle system for a trip along one or more routes based on the operational parameters of the energy storage device;
generating a first trip plan for the trip, the first trip plan designating one or more operational settings for the first vehicle system at one or more of different locations, different times, or different distances along the one or more routes, the one or more operational settings designated to drive the first vehicle system toward achievement of one or more objectives of the first trip plan;
determining when a second vehicle system will obtain or supply energy from or to an off-board energy supply system;
determining when the energy storage device can supply current to the off-board energy supply system; and
modifying the first trip plan based on when the energy storage device can supply the current to the off-board energy supply system and when the second vehicle system will obtain or supply energy from or to the off-board energy supply system; and
supplying current to the off-board energy supply system based on modifying the first trip plan.

17. The method of claim 16, wherein the off-board energy path includes at least one of an off-board energy grid, or a wayside energy storage device.

18. The method of claim 16, wherein the operational parameters of the energy storage device are determined based on at least one of life of the energy storage device, a cooling system parameter, or auxiliary system parameter.

19. The method of claim 16, wherein determining the off-board energy path to provide energy includes receiving a second trip plan of a second vehicle system.

20. The method of claim 16, wherein determining the off-board energy path to provide energy includes determining locations of off-board wayside devices along the one or more routes of the trip.

* * * * *